(12) United States Patent
Takemura

(10) Patent No.: US 6,453,730 B2
(45) Date of Patent: Sep. 24, 2002

(54) SURFACE TEXTURE MEASURING INSTRUMENT, SURFACE TEXTURE MEASURING METHOD AND STYLUS RADIUS MEASURING INSTRUMENT

(75) Inventor: Isamu Takemura, Hiroshima (JP)

(73) Assignee: Mitutoyo Corporation, Kanagawa (JP)

( * ) Notice: Subject to any disclaimer, the term of this patent is extended or adjusted under 35 U.S.C. 154(b) by 6 days.

(21) Appl. No.: 09/805,935

(22) Filed: Mar. 15, 2001

(30) Foreign Application Priority Data

Mar. 29, 2000  (JP) ........................................ 2000-090417

(51) Int. Cl.⁷ ............................. G01B 5/28; G01B 5/20
(52) U.S. Cl. ........................................... 73/105; 33/554
(58) Field of Search ..................... 73/104, 105; 33/554, 33/504, 551

(56) References Cited

U.S. PATENT DOCUMENTS 5,740,616 A   4/1998  Seddon et al. ................ 33/554

FOREIGN PATENT DOCUMENTS

JP   8-43078   2/1996

*Primary Examiner*—Hezron Williams
*Assistant Examiner*—Jay L Politzer
(74) *Attorney, Agent, or Firm*—Oliff & Berridge, PLC

(57) ABSTRACT

A Stylus 1 is moved along the surface of a workpiece 20 and the surface texture of the workpiece 20 is measured based on the displacement of the stylus 1 in the Z direction. A spherical reference gage of known radius is measured with the stylus 1 in advance and radius values r of the tip sphere of the stylus 1 are calculated according to angle by subtracting the radius R of the reference gage from the measured values. The actual contour of workpiece 20 is calculated by using the radius values r as the correction data according to angle and subtracting the correction values according to angle and subtracting the correction values according to angle from the measured data obtained by movement along the surface of workpiece 20.

13 Claims, 7 Drawing Sheets

| θ | r |
|---|---|
| θ1 | r1 |
| θ2 | r2 |
| θ3 | r3 |

SURFACE TEXTURE MEASURING INSTRUMENT, SURFACE TEXTURE MEASURING METHOD AND STYLUS RADIUS MEASURING INSTRUMENT

BACKGROUND OF THE INVENTION

1. Field of the Invention

The invention relates to a surface texture measuring instrument, and a surface texture measurement method, in which the contour, surface roughness, surface waviness, etc., of a workpiece is measured by moving a stylus along a surface of the workpiece, in particular, relates to a technique for correcting the error due to the tip shape of the stylus. The invention also relates to a stylus radius measuring instrument.

2. Description of the Related Art

Surface texture measuring instruments, in which a stylus is made to contact a workpiece and moved along the workpiece surface to measure the contour, surface roughness, surface waviness, etc., of the workpiece, have been known in the related art. Such surface texture measuring instruments are used in the measurement of machined parts, etc. With a surface texture measuring instrument, when the stylus is moved in one direction (X axis) along the workpiece surface by means of a motor, the stylus becomes displaced in the vertical direction (Z direction) due to surface irregularity of the workpiece surface. By measuring the displacement in the X direction and the displacement in the Z direction, the contour, surface roughness and surface waviness of the workpiece can be measured.

However, since the cross-sectional shape of the tip portion of the stylus that comes in contact with the workpiece is not a point but is of an arcuate shape of finite size, the locus expressed by the Z-direction displacement of the stylus will not coincide with the actual contour of the workpiece.

FIG. 8 illustrates the difference between the locus obtained by measurement and the actual contour of a workpiece. In this Figure, a stylus 1 is displaced in the X direction and is displaced in the Z direction according to the surface texture of the workpiece. As indicated by 100 in the Figure, the measured locus of the workpiece that corresponds to the displacement of the stylus 1 is the locus of a predetermined reference point of the stylus 1 (approximately the central point of the arcuate portion of the stylus tip). In the measured locus of the workpiece, an offset, corresponding to the radius r of the tip arc of stylus 1, arises with respect to the actual contour 200 of the workpiece. In the case where the stylus is mounted to a rotatable arm and undergoes arcuate movement, the locus 100 is obtained by correcting for the arc error that accompanies this arcuate movement. Thus in order to obtain the actual contour of the workpiece, the measured value was offset by just the radius r of the tip arc of stylus 1.

However, the cross-sectional shape of the tip of stylus 1 is not strictly circular but its radius value differs according to position. Thus as the workpieces to be measured are made finer and higher in accuracy, cases have arisen where the use of just the representative value of the tip radius r as the offset in the related art is inadequate for measurements of such high accuracy.

SUMMARY OF THE INVENTION

The invention has been made in view of the above problem of the related art. It is an object of the invention to provide a surface texture measuring instrument and a surface texture measuring method, in which the actual surface texture, such as the contour, surface roughness, surface waviness, etc., of a workpiece can be obtained at high accuracy by performing correction, based on the cross-sectional shape of the tip of the stylus, of the measured value obtained by measuring the displacement of the stylus in the Z direction. It is another object of the invention to provide a stylus radius measuring instrument.

In order to achieve the above object, a surface texture measuring instrument according to the invention, in which a surface texture of a workpiece is measured by moving a stylus along a surface of the workpiece and measuring a displacement of the stylus in the Z direction, comprises a memory section, which stores radius values according to angle of the stylus that are obtained by measuring a spherical, cylindrical, or knife-edge-shaped reference gage of known radius with the stylus, and a correction section, which corrects measured values based on the radius values of the stylus stored in the memory section.

Here, in the case where the stylus is mounted on a rotatable arm and undergoes arcuate movement, the surface texture measuring instrument preferably comprises a detection section, which detects an angle of inclination of the stylus with respect to the Z direction, wherein the correction section corrects the measured values based on the radius values and the angles of inclination of the stylus.

The object van be also achieved by a surface texture measuring instrument, in which a surface texture of a workpiece is measured by moving a stylus along a surface of the workpiece and measuring a displacement of the stylus in the Z direction, comprising a radius value calculation section, which calculates radius values according to angle of the stylus that are obtained by measuring a spherical, cylindrical, or knife-edge-shaped reference gage of known radius with the stylus, memory section, which stores the radius values of the stylus, and a correction section, which corrects measured values based on the radius values of the stylus stored in the memory section.

Here, in the case where the stylus is mounted on a rotatable arm and undergoes arcuate movement, the surface texture measuring instrument preferably comprises a detection section, which detects an angle of inclination of the stylus with respect to the Z direction, wherein the radius calculation section calculates the radius values based on the angles of inclination of the stylus, and the correction section corrects the measured values based on the radius values and the angles of inclination of the stylus.

Further, in order to achieve the above object, a surface texture measurement method according to the invention, in which a surface texture of a workpiece is measured by moving a stylus along a surface of the workpiece and measuring a displacement of the stylus in the Z direction, comprises a measurement step, in which the workpiece is measured by the stylus, and a correction step, in which measured values of the workpiece are corrected using correction values. The correction value is the difference between measured value according to angle that was obtained by measuring a spherical, cylindrical, or knife-edge-shaped reference gage of known radius with the stylus and the radius value of the reference gage.

Here, in the case where the stylus is mounted on a rotatable arm and undergoes arcuate movement, the measured value is preferably corrected in the correction step by using the correction values and angles of inclination of the stylus with respect to the Z direction.

The object can be achieved by a surface texture measurement method, in which the surface texture of a workpiece is measured by moving a stylus along a surface of the workpiece and measuring a displacement of the stylus in the Z direction, comprising a measurement step, in which the workpiece is measured by the stylus, a correction value calculation step, in which correction values are calculated as the difference between measured values according to angle that were obtained by measuring a spherical, cylindrical, or knife-edge-shaped reference gage of known radius with the stylus and the radius value of the reference gage, and a correction step, in which measured values of the workpiece are corrected using the correction values.

Here, in the case where the stylus is mounted on a rotatable arm and undergoes arcuate movement, the correction values are preferably corrected in the correction value calculation step by using angles of inclination of the stylus with respect to the Z direction, and the measured values are corrected in the correction step by using the correction values and the angles of inclination of the stylus.

As has been described above, with this invention, a spherical, cylindrical, or knife-edge-shaped reference gage is measured and the radius values according to angle of the stylus are calculated from the measurement results of the reference gage. To be more specific, radius values of the stylus are calculated by subtracting the known radius values of the reference gage from the measured values of the reference gage. The radius values according to angle of the stylus indicate the deviation of the stylus from a perfect circle, and by using these radius values as correction values and correcting the measured values obtained by actual movement of a workpiece by the correction values according to angle, the actual contour of the workpiece can be obtained.

DETAILED DESCRIPTION OF THE PREFERRED EMBODIMENT

Embodiments of this invention shall now be described with reference to the drawings.

Figure 1:
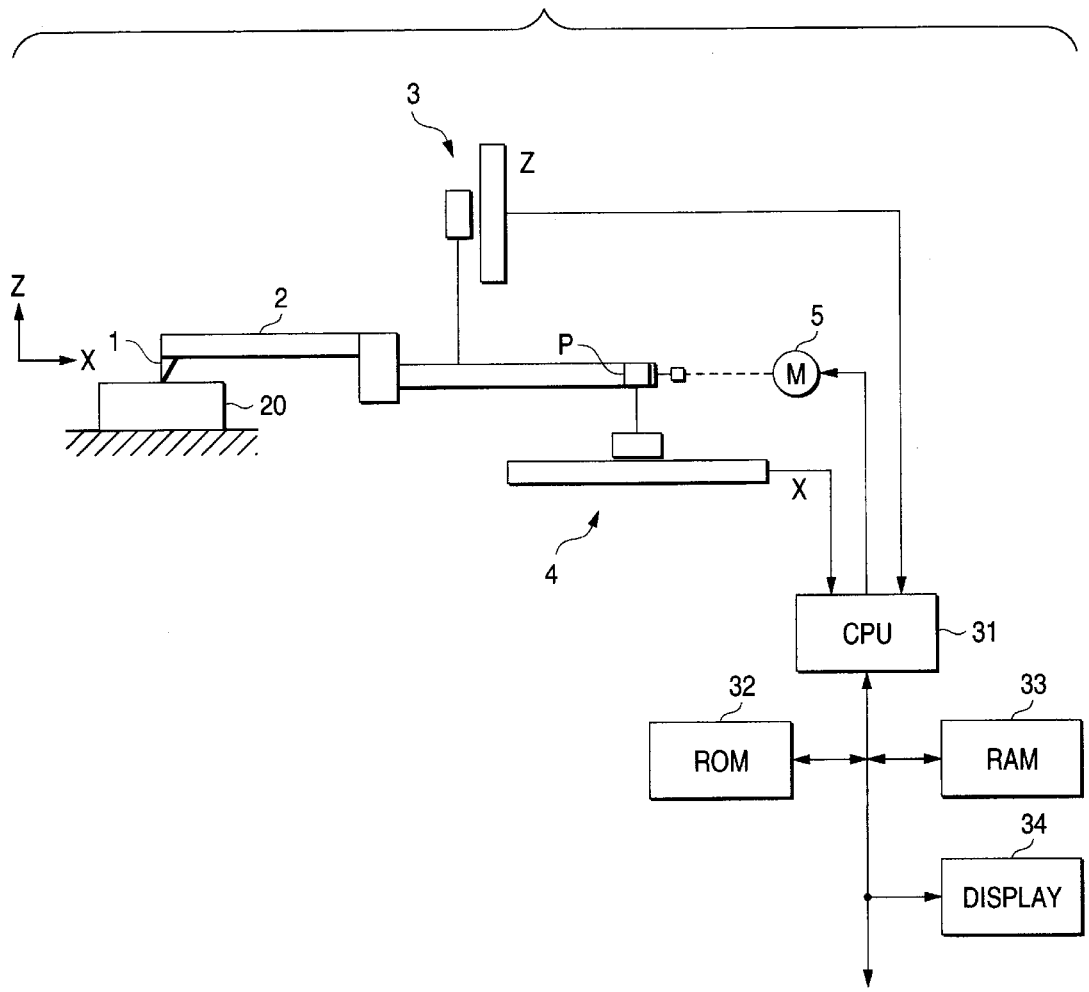
FIG. 1 is a layout block diagram of a surface texture measuring instrument of an embodiment according to the invention.

FIG. 1 is a layout diagram of a surface texture measuring instrument of an embodiment. A stylus 1 is provided on the tip of an arm 2 which undergoes arcuate movement about a rotation center P. While the stylus 1 is made to contact the surface of a workpiece 20, a motor 5 is driven by commands from a CPU 31 to move stylus 1 in the X direction. The amount of movement in the X direction at this time is detected by a displacement detector 4 and the detected value is supplied to CPU 31. Also, the displacement of stylus 1 in the Z direction (the vertical direction perpendicular to the X direction) is detected by a displacement detector 3, and the detected value is likewise supplied to CPU 31). The X direction and Z direction detection values that are supplied to CPU 31 are paired and stored as measured data $(x_i, z_i)$ ($i=1$ n; n is the number of measurement points) in RAM 33. The measured data stored in RAM 33 are of values which are offset with respect to the actual contour data of workpiece 20 by just the amounts corresponding to the shape of the tip of stylus 1. The CPU 31 therefore reads out these measured data stored in RAM 33 and outputs these to display 34 upon correction. The correction of the measured data is performed using the correction data that are stored in advance in ROM 32 or RAM 33. The correction data can be obtained by measuring a spherical, cylindrical, or knife-edge-shaped reference gage of known radius with stylus 1 prior to the measurement of workpiece 20. The shape of stylus 1 to be used is not limited to a sphere, and the stylus may be a single-angle stylus, double-angle stylus, knife-edge shaped stylus or other stylus or non-spherical shape as long as the cross-sectional shape is arcuate.

Figure 2:
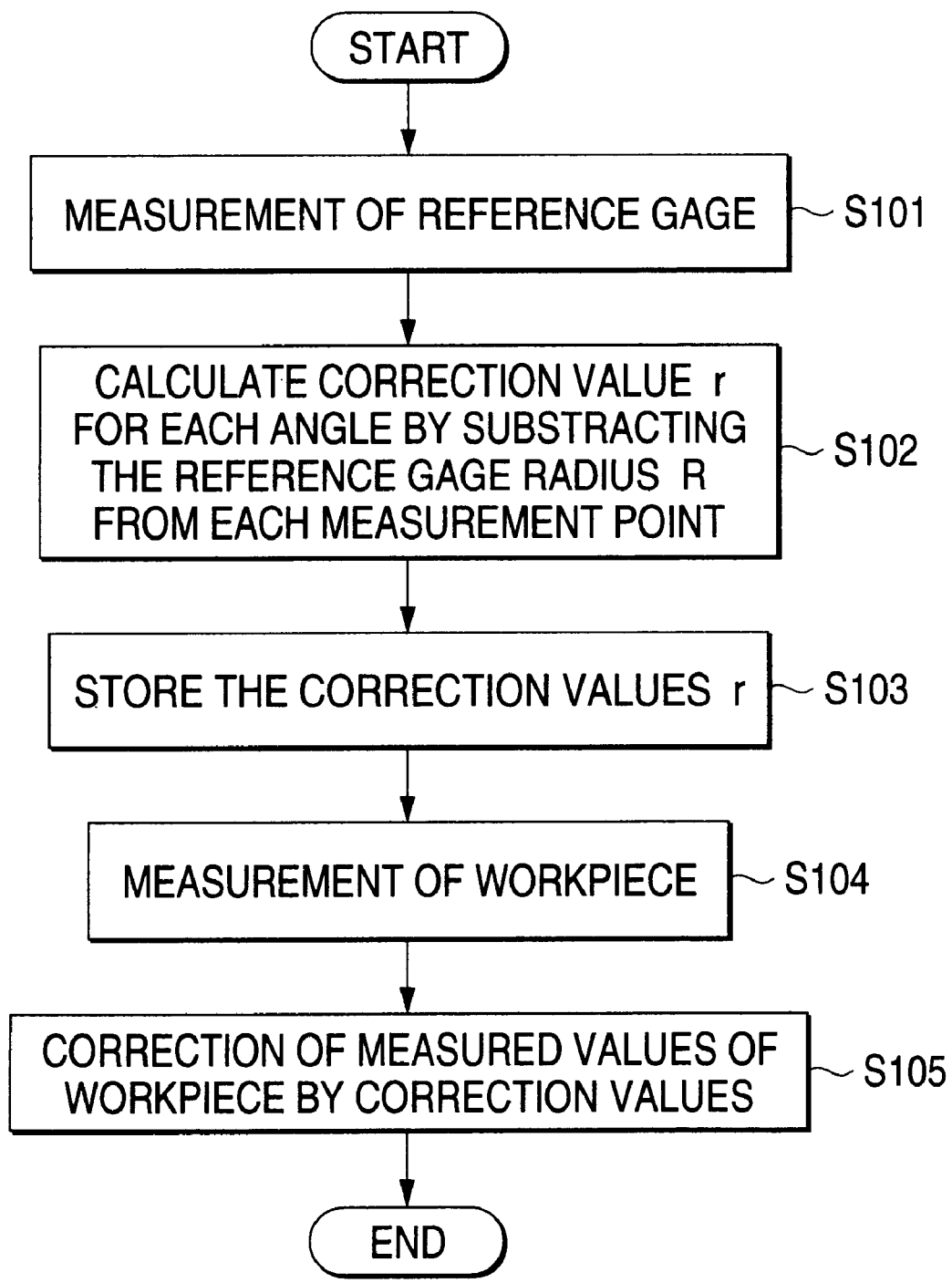
FIG. 2 is an overall process flowchart of the surface texture measuring instrument of the embodiment according to the invention.

FIG. 2 shows the overall process flowchart of the present embodiment. First, prior to the measurement of workpiece 20, the measurement of the reference gage is performed (S101). Here, a spherical or cylindrical reference gage of a known radius R is used as the reference gage. The condition that the reference gage should satisfy is that the cross-sectional shape along the X direction in which stylus 1 is moved is a circle (or semicircle) of a known radius R. Obviously as long as the portion that comes in contact with the stylus satisfies this condition, the overall shape of the reference gage does not have to be spherical or cylindrical.

After measurement of the reference gage, the correction value r for each angle, i.e., the radius of the tip sphere of stylus 1 for the corresponding angle, is calculated by subtracting the radius R of the reference gage from the measured value at the corresponding measurement point (S102). The calculated correction value r is then stored according to angle in ROM 32 or RAM 33 (S103).

Figures 3, 4:
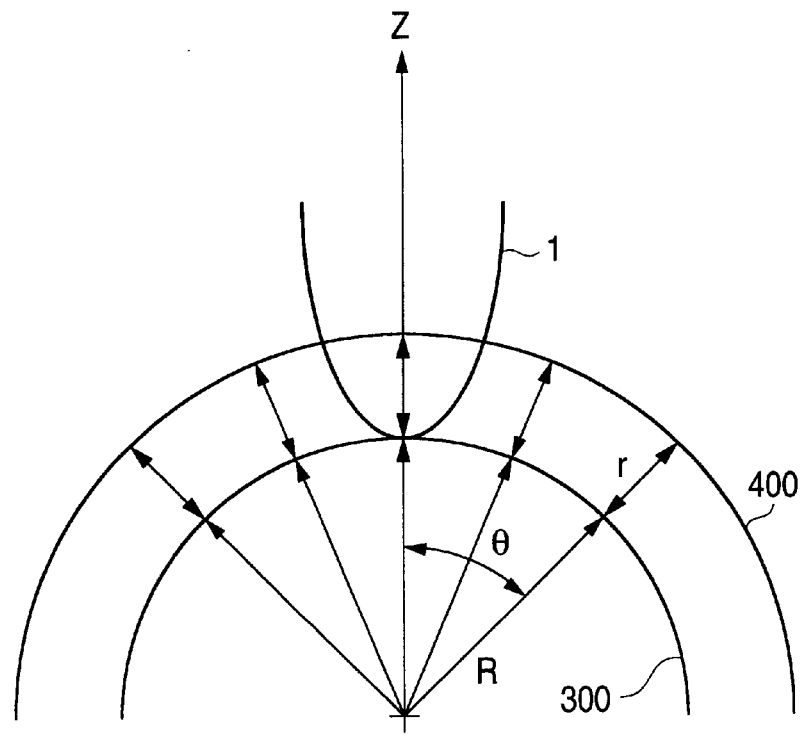
FIG. 3 is a diagram explaining the manner of measurement of a reference gage.
FIG. 4 is an explanatory diagram of the correction values.

The processes of S101 or S103 are the correction data calculation processes, and these processes shall now be described in more detail. FIG. 3 is a schematic diagram that shows the condition where the reference gage is measured by stylus 1. The radius R of the reference gage is known and measurement results are obtained by moving stylus 1 along the surface of the reference gage. In the Figure, the contour 400 measured by stylus 1 is obtained at each angle for the actual contour 300 of the reference gage. By then subtracting the known radius value R of the reference gage from the measured values obtained for each angle, the correction value r for each angle, i.e., the radius of the tip sphere of stylus 1 is calculated. In the case where the stylus is mounted to a rotatable arm and undergoes arcuate movement, this locus 400 is obtained by correcting for the arc error that accompanies this arcuate movement.

FIG. 4 shows an example of the correction values r according to angle that are calculated in the above manner. The correction values r are calculated according to the angles θ with respect to a predetermined direction (Zdirection). To be more specific, the correction values, i.e.,, the radii r1, r2, r3, . . . of stylus 1 are calculated according to the angles θ1, θ2, θ3, . . . and are stored in ROM 32 or RAM 33. Though in the case where the cross-sectional shape of the tip of stylus 1 is a perfect circle, a fixed value r will be obtained regardless of the angle θ, since the cross-sectional shape of the tip of stylus 1 is generally not a perfect circle as has been mentioned above, the radius value r varies according to the angle θ. The manner of variation is expressed as the correction data as shown in FIG. 4. The correction values r can be stored in such a table format in ROM 32 or RAM 33.

Returning now to FIG. 2, after calculating and storing the correction values r according to angle, the workpiece 20 to be measured is set at a prescribed position and stylus 1 is moved along the surface of workpiece 20 to measure the surface texture of workpiece 20 (S104). As has been mentioned above, the measured data are stored in RAM 33. After storage of the measured data in RAM 33, CPU 31 corrects the measured data using the correction values r according to angle that are stored in ROM 32 or RAM 33 (S105).

Figure 5:
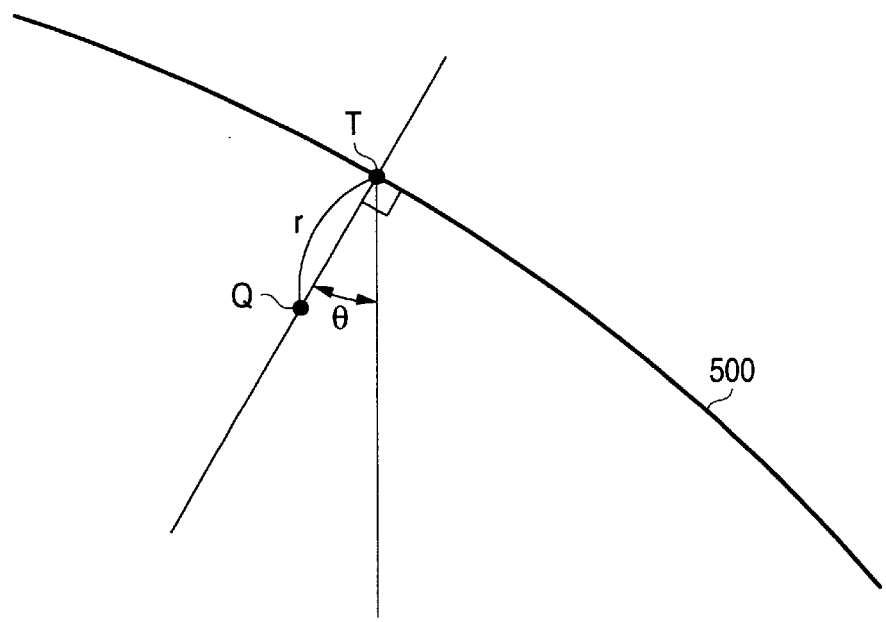
FIG. 5 is an explanatory diagram illustrating the method of correction of the measured contour using the correction values.

FIG. 5 illustrates the method of correction using the correction values r. As shown in Figure, for the contour (measured contour) 500 of the workpiece that is indicated by the measured data, the angle θ between the Z direction and the direction of correction of the stylus tip radius (in general, the tangential direction) at an arbitrary point T of the measured contour 500, is calculated for the point T. Then, the correction value r for this angle θ is read out from the correction value table that is stored in ROM 32 or RAM 33. The correction value r that has been read out is then subtracted from measured contour 500 to obtain the point Q. This point Q becomes the data corresponding to the actual contour of workpiece 20. The corrected data are then stored again in RAM 33. After the correction process has been performed for all points of measured contour 500, the corrected data are displayed on display 34. In the case where the stylus is mounted to a rotatable arm and undergoes arcuate movement, this locus 500 is obtained by correcting the arc error that accompanies this arcuate movement.

It is also preferable to calculate the data between the correction data obtained at predetermined intervals, by linear interpolation or curvilinear interpolation.

Also, in the process of obtaining the measured contour 400 obtained by measuring the reference gage, the points between the measured points may be obtained by curvilinear interpolation using Bezier curves or spline curves, etc., or by linear interpolation. It is also preferable to smoothen the measured locus to eliminate the influence of noise.

The processes of S101 to S103 may be performed separately from the measurement of workpiece 20 or as continuous processes to be performed prior to the measurement of workpiece 20. That is, the measurement of workpiece 20 may be performed after storage of the correction values in ROM 32 in advance. In the condition where the correction values are not stored in the memory, the reference gage may be measured and the correction values may be calculated based on the known radius R and stored in the memory and thereafter, measurement can be performed upon replacing the reference gage with the workpiece.

By thus correcting the measured data of the workpiece based on the correction values r according to angle that are obtained by measurement of a reference gage, that is, based on the radii of the tip sphere of stylus 1, the actual contour of workpiece 20 can be calculated at high accuracy.

If in measuring a reference gage, the reference gage is measured upon mounting the stylus 1 to a supporting part, which is displaced only in the Z direction (that is, an arm that does not undergo arcuate movement), instead of the measuring device shown in FIG. 1, and the resulting correction values are stored in ROM 32 or RAM 33, the use of the stored correction values for correcting the measured values obtained by the measuring device shown in FIG. 1 may not be appropriate in some cases. This is because in the case where stylus 1 is mounted to the tip of the arm 2, stylus 1 is not displaced in the Z direction to be exact as has been mentioned above but undergoes arcuate movement about rotation center P, and the points at which the tip of stylus 1 contacts workpiece 20 also vary based on the arcuate rotation angle α of arm 2.

Figure 6:
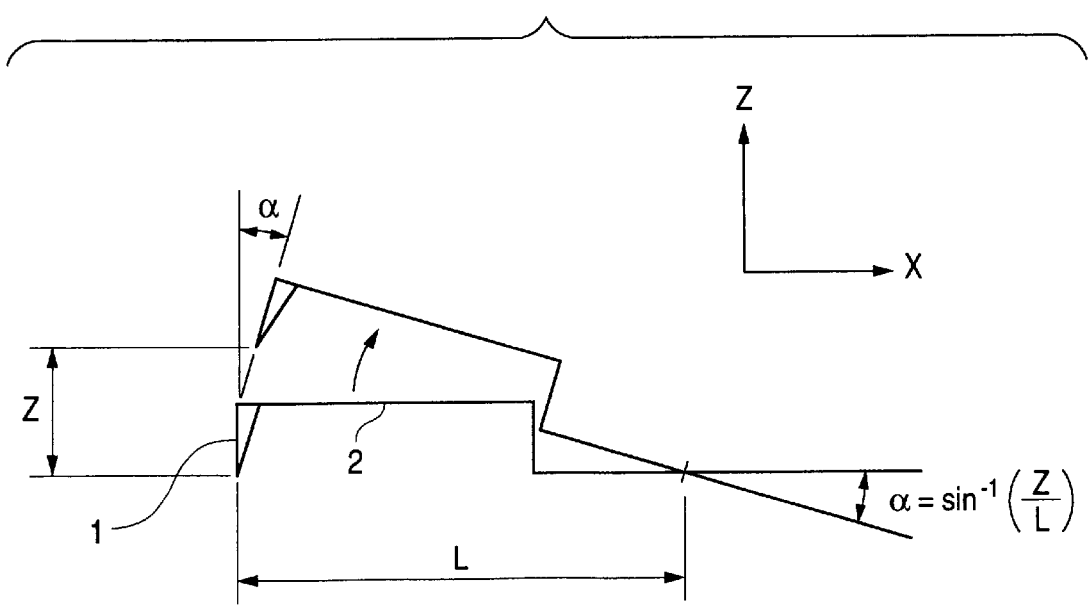
FIG. 6 is an explanatory diagram illustrating the arcuate movement of the arm.
Figure 7A:
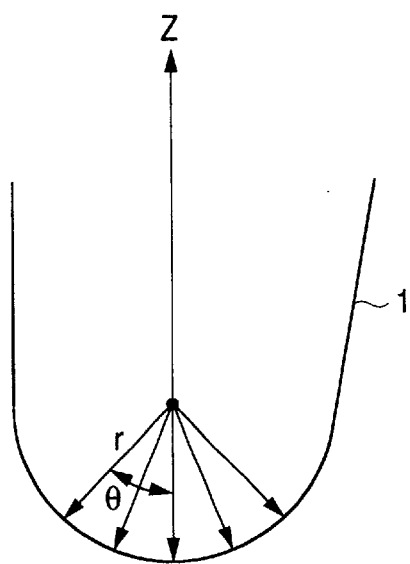
FIGS. 7A–B are respectively explanatory diagrams illustrating the inclination of a stylus 1 that accompanies the arcuate movement of the arm.
Figure 7B:
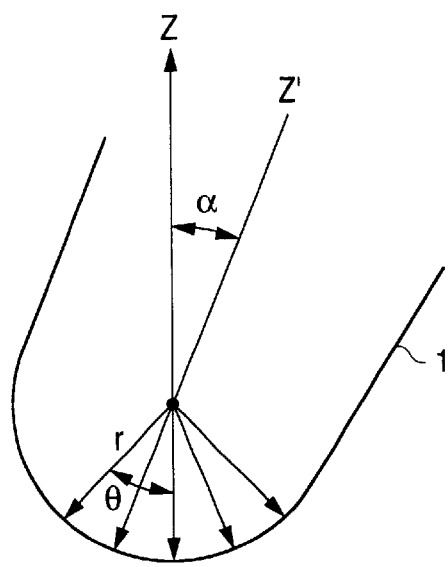
Figure 8:
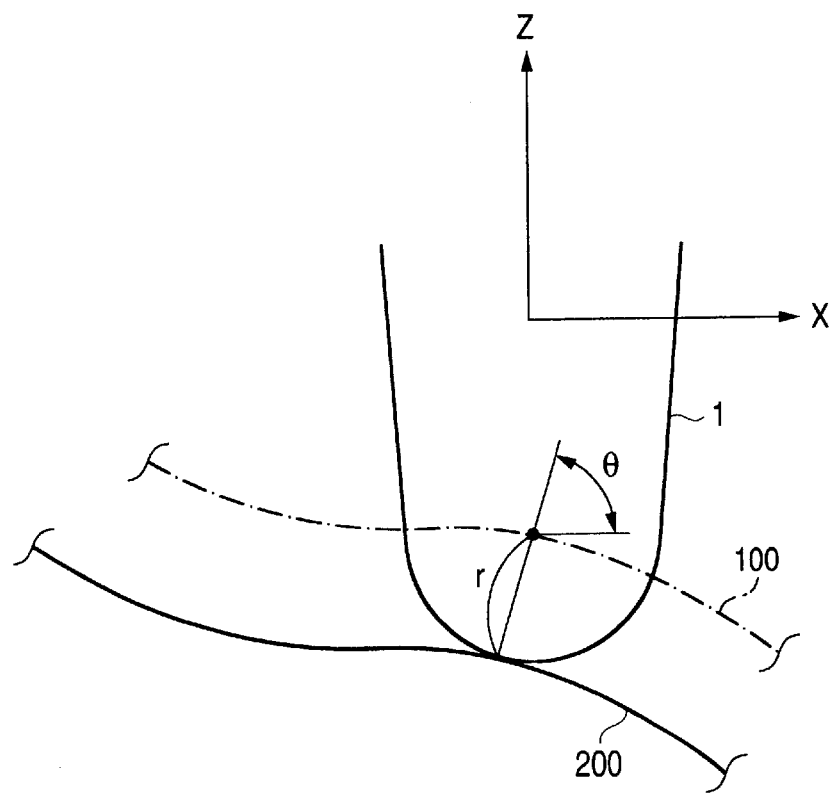
FIG. 8 is an explanatory diagram illustrating the difference between the workpiece contour and the measured contour.

The variation of the point of contact of stylus 1 in accompaniment with the arcuate movement of arm 2 is shown schematically in FIGS. 6 and 7A–B. As shown in FIG. 6, when arm 2 rotates by just α from the Z direction, the tip of stylus 1 also rotates by just α from the Z direction as shown in FIGS. 7A–7B, and the apparent Z direction (Z' direction) as viewed from the tip of stylus 1 inclines by just α. By this inclination, the angle of contact with the surface of workpiece 20 becomes displaced as well. Thus in correcting the measured values based on the stored correction values (these are the correction values for a inclination of 0), the inclination angle α must be taken into consideration. To be more specific, it is preferable to correct the measured value by reading out, from the correction table, not the correction data corresponding to the angle θ shown in FIG. 5 but the correction data corresponding to the angle obtained by subtracting just the inclination angle α from θ, i.e., the angle θ'=θ−α.

Since the influence of the inclination angle on the correction value will be small in the case where the arcuate movement of arm 2 is minute, that is, in the case where α is minute, it is also preferable to make the correction using the inclination angle α only when the rotation angle of arm 2 becomes greater than or equal to a predetermined angle. The rotation angle α of arm 2 can be obtained from the displacement in the Z-axis direction and the rotation radius L of the arcuate movement of arm 2 as:

$$\alpha = \sin^{-1}\left(\frac{Z}{L}\right)$$

or as $$\alpha = \cos^{-1}\left(\frac{\sqrt{L^2 - Z^2}}{L}\right)$$

Or, α may also be detected using an angle sensor provided on arm 2 or the vicinity of arm 2, and supplied to CPU 31. In the case where a reference gage is measured using the measuring device shown in FIG. 1, it is also preferable to perform such a correction for the inclination angle as long as stylus 1 undergoes arcuate movement during the measurement of workpiece 20.

The above-described correction based on the inclination angle α is also preferably performed on the radius values in the case where a reference gage is measured by the measuring device shown in FIG. 1 (that is, in the case where the stylus undergoes arcuate movement). That is, after calculating the radii r1, r2, . . . for each of the angles θ1, θ2, . . . , the angle data are stored in ROM 32 or RAM 33 upon performing the correction to θ'=θ−α. Accurate radius values will then be stored in the form of a table.

Figure 9:
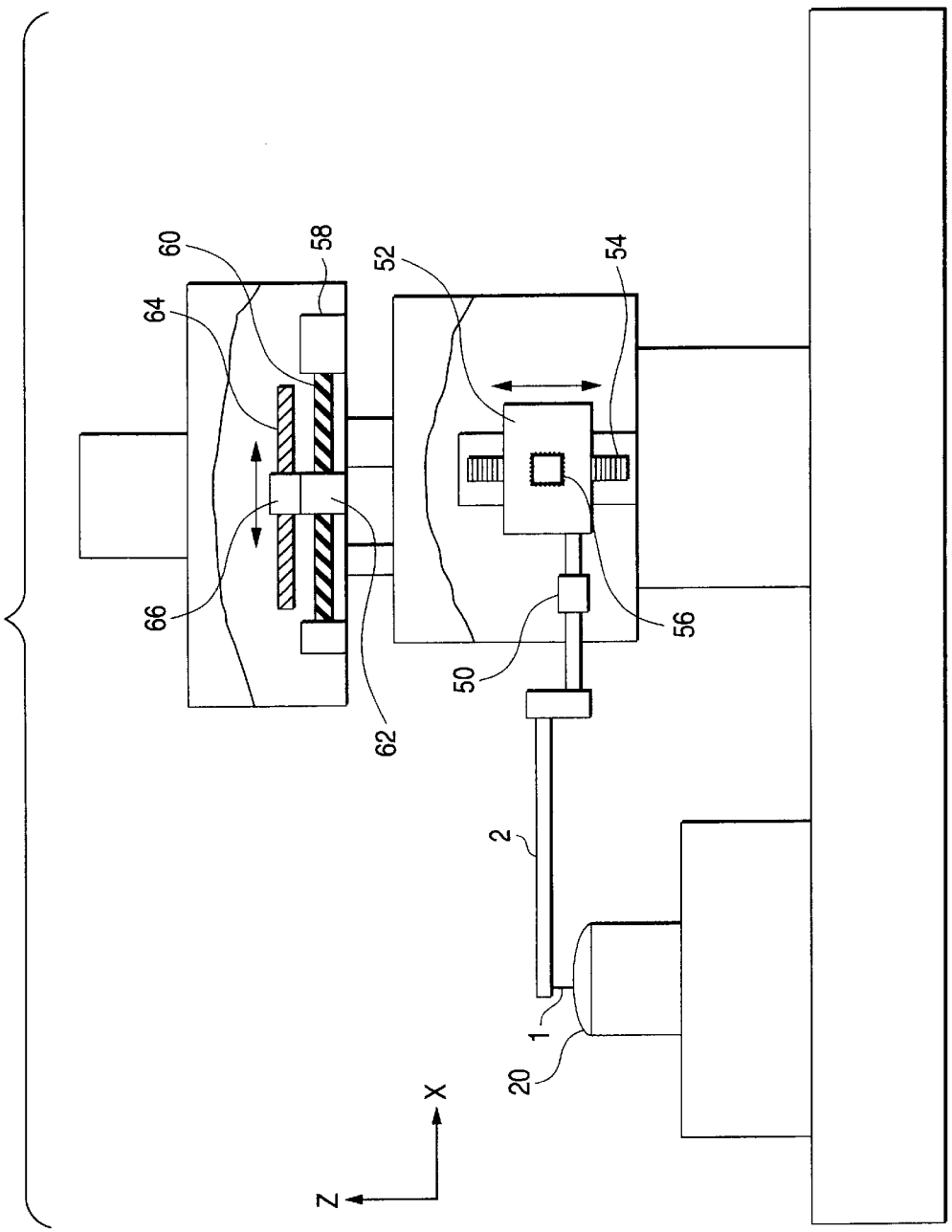
FIG. 9 is a layout diagram of a measuring device of the type with which the stylus moves only in the Z direction.
Figure 10:
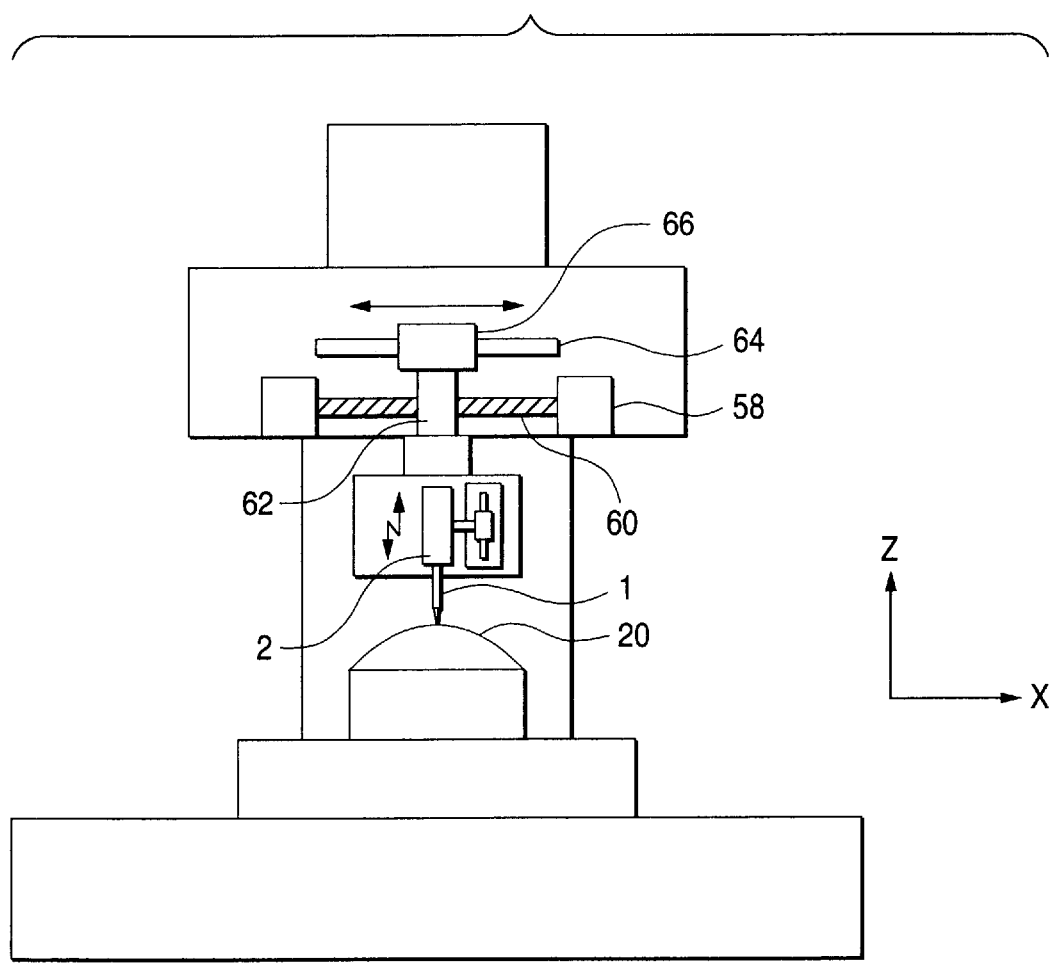
FIG. 10 is a layout diagram of another measuring device of the type with which the stylus moves only in the Z direction.

In the case where a workpiece 20 is to be measured not with a measuring device such as shown in FIG. 1 but by a measuring device, with which stylus 1 is mounted to a supporting part that is displaced only in the Z direction as shown in FIG. 9, the correction for inclination is obviously unnecessary since the inclination α of a stylus 1 from the Z-axis direction does not exist to start with. To describe the condition shown in FIG. 9 briefly, an arm 2 is supported on a linear driving device 52 which is displaced in the Z direction, and the linear driving device 52 moves in the Z direction so that the measuring pressure obtained from a measuring pressure sensor 50 (distortion sensor) provided on the arm 2 will be kept constant at all times. The linear driving device 52 also moves in the X direction by means of a motor 58, a ball screw 60, and a nut 62, and the stylus 1 that is mounted to the tip of arm 2 is thereby scanned along the surface of workpiece 20 in the X direction. A detector 66 is provided on the nut 62 and the displacement of the stylus 1 in the X direction is detected by reading a scale 64 with the detector 66. The linear driving device 52 is also provided with a detector 56, and the displacement of stylus 1 in the Z direction is detected by reading a linear scale 54 with the detector 56. It can be understood that since the linear driving device 52 displaces the arm 2 in the Z direction in a manner such that the measuring pressure will always be constant, the stylus 1 will be displaced only in the Z direction. The measurement of workpiece 20 may also be made using a simpler measuring device such as shown in FIG. 10, In FIG. 10, a stylus 1 is mounted to arm 2, which is displaced only in the Z direction, and arm 2 is moved in the X direction by means of a motor 58, a ball screw 60, and a nut 62 to cause the surface of the workpiece 20 to be scanned by the stylus 1. With either of the measuring devices shown in FIGS. 9 and 10, since the stylus 1 is displaced only in the Z direction, the correction for arcuate movement is unnecessary.

As has been described above, with this invention, since correction data on the tip sphere of the stylus are obtained according to angle by the use of a reference gage and the measurement results are corrected using these correction data, the surface texture of the workpiece can be measured at high accuracy.

What is claimed is:

1. A surface texture measuring instrument for measuring a surface texture of a workpiece, said instrument comprising:
    a stylus moving along a surface of the workpiece;
    a measurement section for measuring a displacement of the stylus;
    a memory section for storing radius values according to angle of the stylus;
    a correction section for correcting a measured value obtained in the measurement section of the basis of the radius values of the stylus stored in the memory section.

2. The surface texture measuring instrument according to claim 1, comprising:
    a detection section for detecting an angle of inclination of the stylus with respect to a Z direction,
    wherein said correction section corrects the measured value on the bases of the radius values and the angle of inclination of the stylus.

3. The surface texture measuring instrument according to claim 1, comprising:
    a radius value calculation section for calculating the radius values according to angle of the stylus on the basis of a measured value of a reference gage of a known radius measured with the stylus.

4. The surface texture measuring instrument according to claim 3, wherein said radius value calculation section calculates the radius values according to angle of the stylus on the basis of a difference between the measured value of the reference gage and the radius value of the reference gage.

5. The surface texture measuring instrument according to claim 3, wherein the reference gage is one of spherical, cylindrical, and knife-edge-shaped.

6. The surface texture measuring instrument according to claim 3, comprising:
    a detection section for detecting an angle of inclination of the stylus with respect to a Z direction,
    wherein said radius value calculation section calculates the radius values according to angle of the stylus on the basis of the measured value of the reference gage and the angle of inclination of the stylus.

7. The surface texture measuring instrument according to claim 1, comprising:
    a rotatable arm for holding the stylus arcuately movable;
    a detection section for detecting an angle of inclination of the stylus with respect to a Z direction,
    wherein said correction section corrects the measured value on the basis of the radius value and the angle of inclination of the stylus.

8. The surface texture measuring instrument according to claim 3, comprising:
    a rotatable arm for holding the stylus arcuately movable;
    a detection section for detecting an angle of inclination of the stylus with respect to a Z direction,
    wherein said radius value calculation section calculates the radius values according to angle of the stylus on the basis of the measured value of the reference gage and the angle of inclination of the stylus.

9. A method of measuring a surface texture of a workpiece, said method comprising:
    measuring a displacement of a stylus while moving the stylus along a surface of the workpiece;
    correcting a measured value obtained in the measuring step by using a correction value on the basis of radius values according to angle of the stylus.

10. The method of measuring the surface texture of the workpiece according to claim 9, comprising:
    measuring a reference gage of a known radius with the stylus:
    calculating a difference between the measured value of the reference gage and the radius value of the reference gage as the correction value.

11. The method of measuring the surface texture of the workpiece according to claim 10, wherein the reference gage is one of spherical, cylindrical, and knife-edge-shaped.

12. The method of measuring the surface texture of the workpiece according to claim 9, comprising:
    detecting an angle of inclination of the stylus with respect to a Z direction,
    wherein in the correction step, the measured value is corrected on the basis of the radius values and the angle of inclination of the stylus.

13. The method of measuring the surface texture of the workpiece according to claim 10, comprising:
    detecting an angle of inclination of the stylus with respect to a Z direction,
    wherein in the calculation step, the correction value is corrected on the basis of the difference and the angle of inclination of the stylus.

* * * * *